(12) United States Patent
Hoang

(10) Patent No.: US 10,677,386 B2
(45) Date of Patent: Jun. 9, 2020

(54) SWIVEL MOUNT FOR ELECTRONIC DEVICES

(71) Applicant: Crestron Electronics, Inc., Rockleigh, NJ (US)

(72) Inventor: Tom Hoang, Rockleigh, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 16/112,170

(22) Filed: Aug. 24, 2018

(65) Prior Publication Data

US 2019/0063666 A1 Feb. 28, 2019

Related U.S. Application Data

(60) Provisional application No. 62/551,820, filed on Aug. 30, 2017.

(51) Int. Cl.
| | | |
|---|---|---|
| *F16M 11/08* | (2006.01) | |
| *A47B 21/03* | (2006.01) | |
| *F16M 13/02* | (2006.01) | |
| *A47B 21/04* | (2006.01) | |

(52) U.S. Cl.
CPC ............ *F16M 11/08* (2013.01); *A47B 21/03* (2013.01); *F16M 13/022* (2013.01); *A47B 21/04* (2013.01); *A47B 2200/008* (2013.01); *A47B 2200/0079* (2013.01); *F16M 2200/022* (2013.01); *F16M 2200/028* (2013.01); *F16M 2200/08* (2013.01)

(58) Field of Classification Search
CPC ................. F16M 11/08; F16M 13/022; F16M 2200/022; F16M 2200/08; F16M 2200/028; A47B 21/03; A47B 2200/0079; A47B 21/04; A47B 2200/008
USPC .............. 248/425, 551; 411/270, 433; 4/695
See application file for complete search history.

(56) References Cited

U.S. PATENT DOCUMENTS

| | | | |
|---|---|---|---|
| 5,377,598 A | 1/1995 | Kirchner et al. | |
| 6,231,020 B1 | 5/2001 | Willson | |
| 7,481,170 B2 | 1/2009 | Sommerfield | |
| 8,698,617 B2* | 4/2014 | Henson | G06F 1/1626 340/539.1 |
| 9,599,276 B2 | 3/2017 | Grziwok | |
| 9,936,823 B2* | 4/2018 | Galant | F16M 11/041 |
| 2009/0255588 A1* | 10/2009 | Bors | E03C 1/04 137/15.01 |
| 2009/0256048 A1 | 10/2009 | Fujikawa et al. | |
| 2009/0321186 A1 | 12/2009 | Louchart | |
| 2012/0037783 A1* | 2/2012 | Alexander | A47F 7/024 248/551 |
| 2012/0193486 A1 | 8/2012 | Levin | |

(Continued)

*Primary Examiner* — Muhammad Ijaz
(74) *Attorney, Agent, or Firm* — Crestron Electronics, Inc.

(57) ABSTRACT

A swivel mount assembly (SMA) for rotational mounting an electronic device onto a substantially stationary apparatus is provided comprising: a mounting portion adapted to mount the SMA to an electronic device; a swivel tube assembly attached to the mounting portion, and adapted to be inserted through a hole in the substantially stationary apparatus, and wherein the swivel tube is further adapted to provide rotational movement of the electronic device in regard to the substantially stationary apparatus; a rotation limiting assembly; and a securing assembly adapted to secure the swivel tube assembly to the substantially stationary apparatus in a securing but rotational manner.

8 Claims, 12 Drawing Sheets

(56) References Cited

U.S. PATENT DOCUMENTS

| | | | | |
|---|---|---|---|---|
| 2013/0043369 A1* | 2/2013 | Wheeler | ................ | A47F 7/024 |
| | | | | 248/551 |
| 2014/0048667 A1* | 2/2014 | Ziesen | ................... | B60R 11/02 |
| | | | | 248/288.11 |
| 2015/0327693 A1* | 11/2015 | Ballhatchet | ........... | A47F 5/0861 |
| | | | | 248/126 |

* cited by examiner

SWIVEL MOUNT FOR ELECTRONIC DEVICES

PRIORITY INFORMATION

The present application claims priority under 35 U.S.C. § 119(e) to U.S. Provisional Patent Application Ser. No. 62/551,820, filed 30 Aug. 2017, the entire contents of which are expressly incorporated herein by reference.

BACKGROUND OF THE INVENTION

Technical Field

Aspects of the embodiments relate generally to a mechanism for mounting and locking electronic devices, and more specifically to a swivel mount system and method of use that can mount, support, and lock electronic devices to a desk or table top, such that the device can rotate about a vertical (normal to the table) axis so that it may be viewed and interacted with by multiple persons in a secure manner.

Background Art

Certain unified communications devices, such as a telephone, are light-weight and often easily portable. Such devices can be used in commercial environments in which multiple users can control certain functions on the devices such as volume. To control the functions, in some situations, each of the multiple users may physically handle the device. Doing so can increase a risk of damage to the device, and, in some cases, theft of the device. In such cases, the device can be locked to a table using a chain.

Accordingly, a need has arisen for a swivel mount system and method of use that can mount, support, and lock electronic devices to a desk or table top, such that the device can rotate about a vertical (normal to the table) axis so that it may be viewed and interacted with by multiple persons in a secure manner.

SUMMARY

It is an object of the embodiments to substantially solve at least the problems and/or disadvantages discussed above, and to provide at least one or more of the advantages described below.

It is therefore a general aspect of the embodiments to provide systems, methods, and modes for mounting and locking an electronics device to a desk or conference room table so that, for example, the device can rotate about a vertical (normal to the table) axis so that it may be viewed and interacted with by multiple persons in a secure manner that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a swivel mount assembly (SMA) for rotational mounting an electronic device onto a substantially stationary apparatus is provided comprising: a mounting portion adapted to mount the SMA to an electronic device; a swivel tube assembly attached to the mounting portion, and adapted to be inserted through a hole in the substantially stationary apparatus, and wherein the swivel tube is further adapted to provide rotational movement of the electronic device in regard to the substantially stationary apparatus; a rotation limiting assembly; and a securing assembly adapted to secure the swivel tube assembly to the substantially stationary apparatus in a securing but rotational manner.

According to the first aspect of the embodiments, the swivel tube assembly comprises: a swivel tube, comprising one or more channels on an exterior surface of the swivel tube; and a mounting plate adapted to rotationally retain the swivel tube, and wherein the mounting plate is further adapted secure the SMA to the electronic device.

According to the first aspect of the embodiments, the rotation limiting assembly comprises: a stop plate, the stop plate comprising a plurality of swivel limiting position holes, each of the swivel limiting holes adapted to retain a screw; a keyed stop washer, the keyed stop washer comprising: one or more channel tabs, wherein each of the one or more channel tabs is adapted to fit within the one or more channels on the swivel tube; and a stop washer tab, wherein the stop washer tab is adapted to interface with the screw that can be located in one or two of the swivel limiting position holes to substantially prevent rotation of the electronic device and swivel tube.

According to the first aspect of the embodiments, the plurality of swivel limiting position holes can be located at substantially any position within circle with a radius such that the screw interfaces with the stop washer tab, such that the substantially any angle of rotation can be achieved.

According to the first aspect of the embodiments, the angle of rotation is limited to less than about 360°.

According to the first aspect of the embodiments, the securing assembly comprises: one or more frictional washers; two or more jam nuts, a rubber washer, and a flat washer.

According to the first aspect of the embodiments, the mounting portion comprises: a substantially rigid, planar component, adapted to be removably attachable to a plurality of electronic devices.

According to the first aspect of the embodiments, the substantially rigid, planar component can be fabricated to match a shape and size of any one the plurality of electronic devices.

According to the first aspect of the embodiments, the swivel tube is adapted to provide passage for one or more of cables that provide one or more of power and data communications to and from the electronic device.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed

BRIEF DESCRIPTION OF THE SEVERAL VIEWS OF THE DRAWINGS

Figure 1:
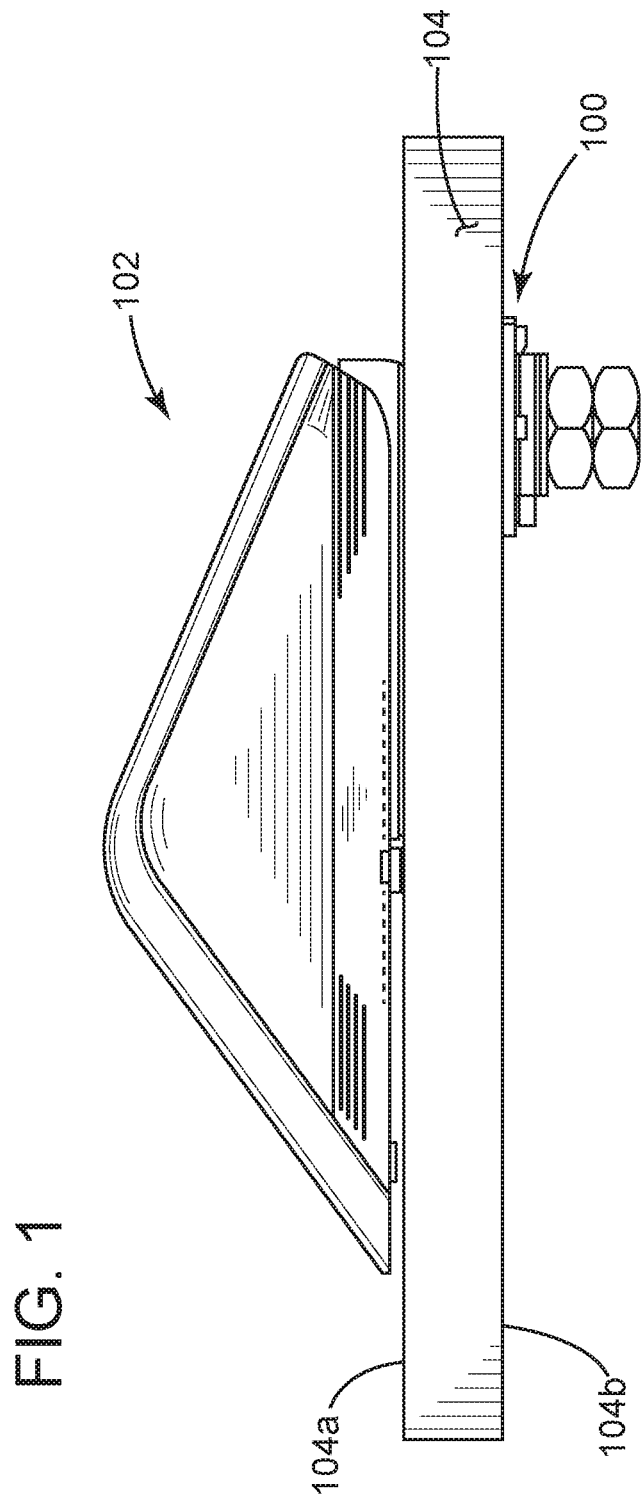

FIG. 1 illustrates a side view of a swivel mount assembly mounted to a table, and which has an electronics devices mounted to the swivel mount assembly according to aspects of the embodiments.

Figure 2:
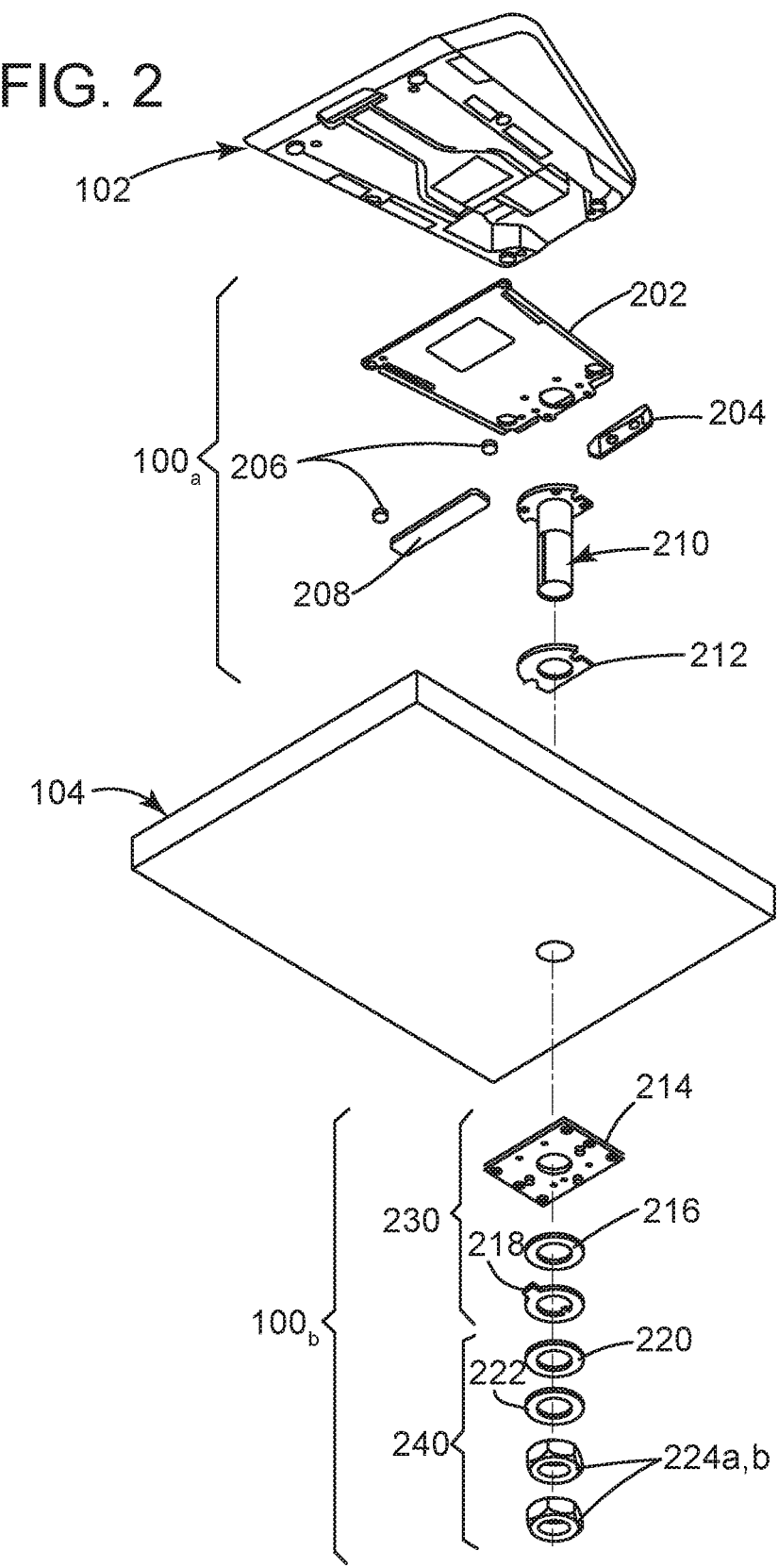

FIG. 2 illustrates an exploded isometric view of the swivel mount assembly as shown in FIG. 1 according to aspects of the embodiments.

Figure 3:
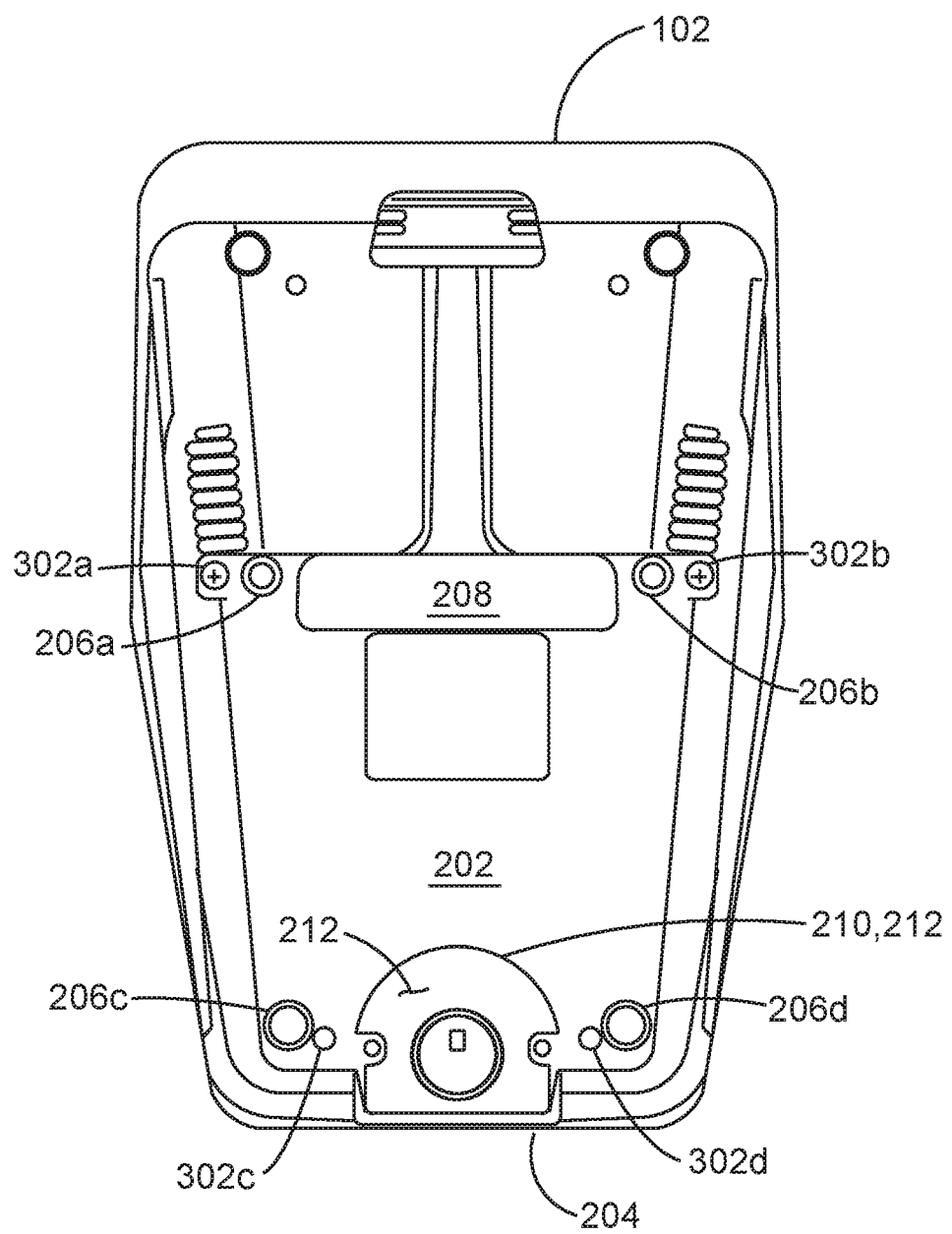

FIG. 3 illustrates a bottom view of the electronic device shown in FIG. 1, with portions of the swivel mount assembly viewable therein, according to aspects of the embodiments.

Figure 4:
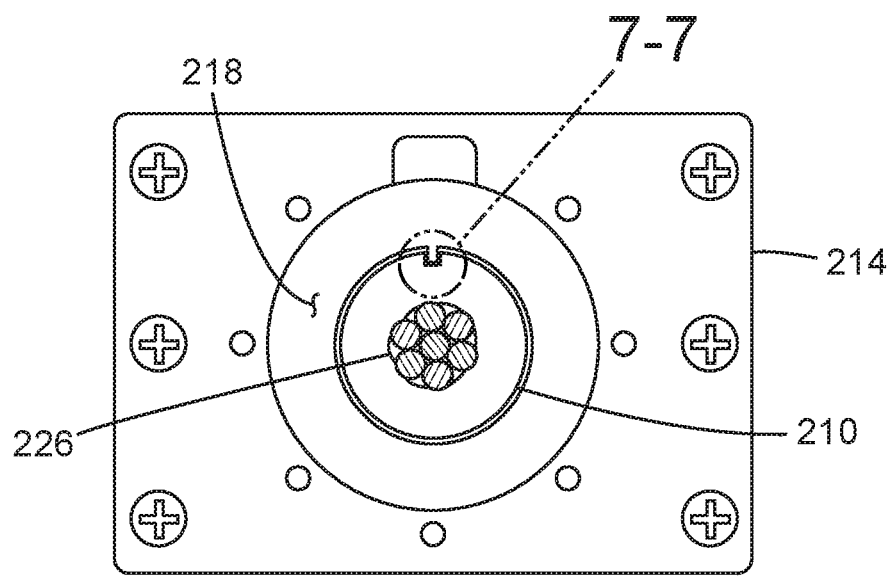

FIG. 4 illustrates a bottom view of a swivel stop plate, portions of a swivel tube assembly, and keyed stop washer according to aspects of the embodiments.

Figure 5:
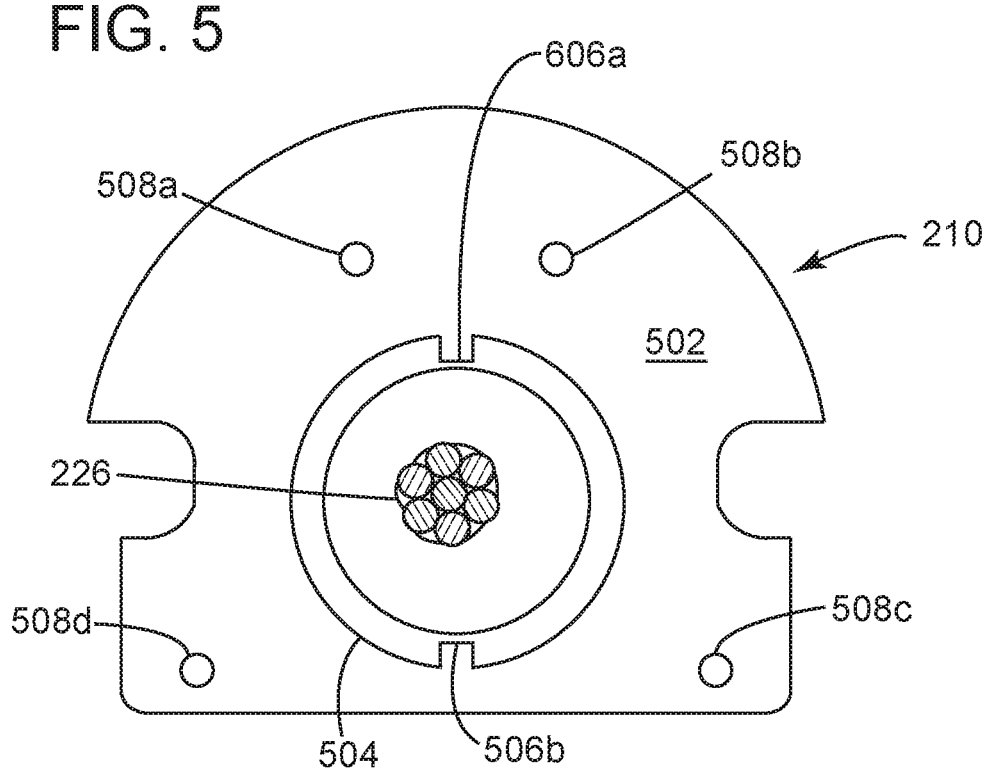

FIG. 5 illustrates a bottom view of the swivel tube assembly as shown in FIGS. 2 and 4 according to aspects of the embodiments.

Figure 6:
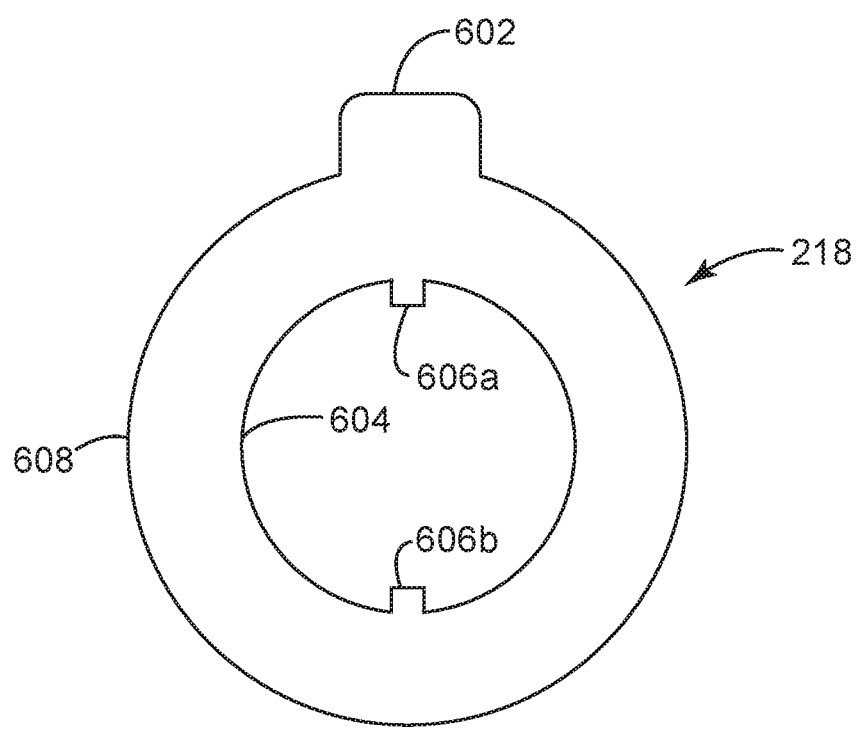

FIG. 6 illustrates a plan view of the keyed stop washer shown in FIGS. 2 and 4 according to aspects of the embodiments.

Figure 7A:
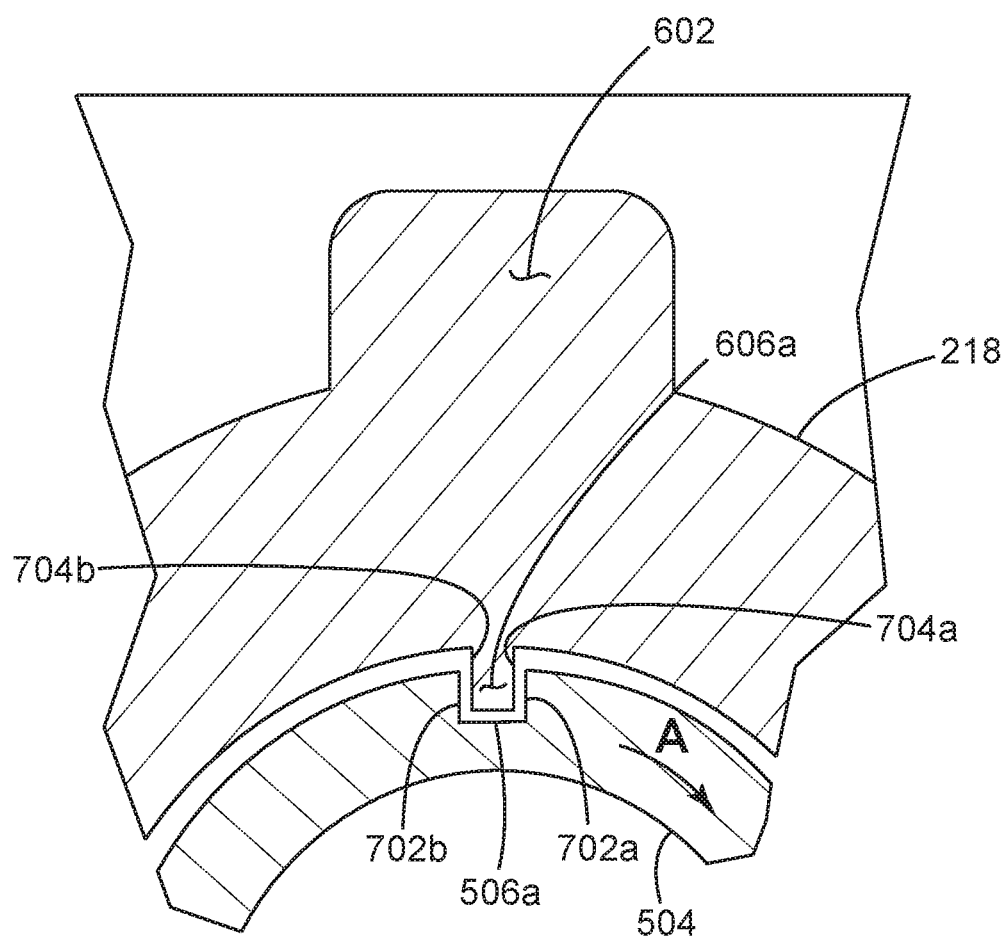

FIG. 7A is a close-up, detailed top view of an assembly between a key-tab portion of the keyed stop washer and a key-channel of the swivel tube portion of the swivel tube assembly, that illustrates a second contact surface of the key-tab coming into contact with a second contact surface of the key-channel when the swivel mount assembly is being rotated in a first direction, according to aspects of the embodiments.

Figure 7B:
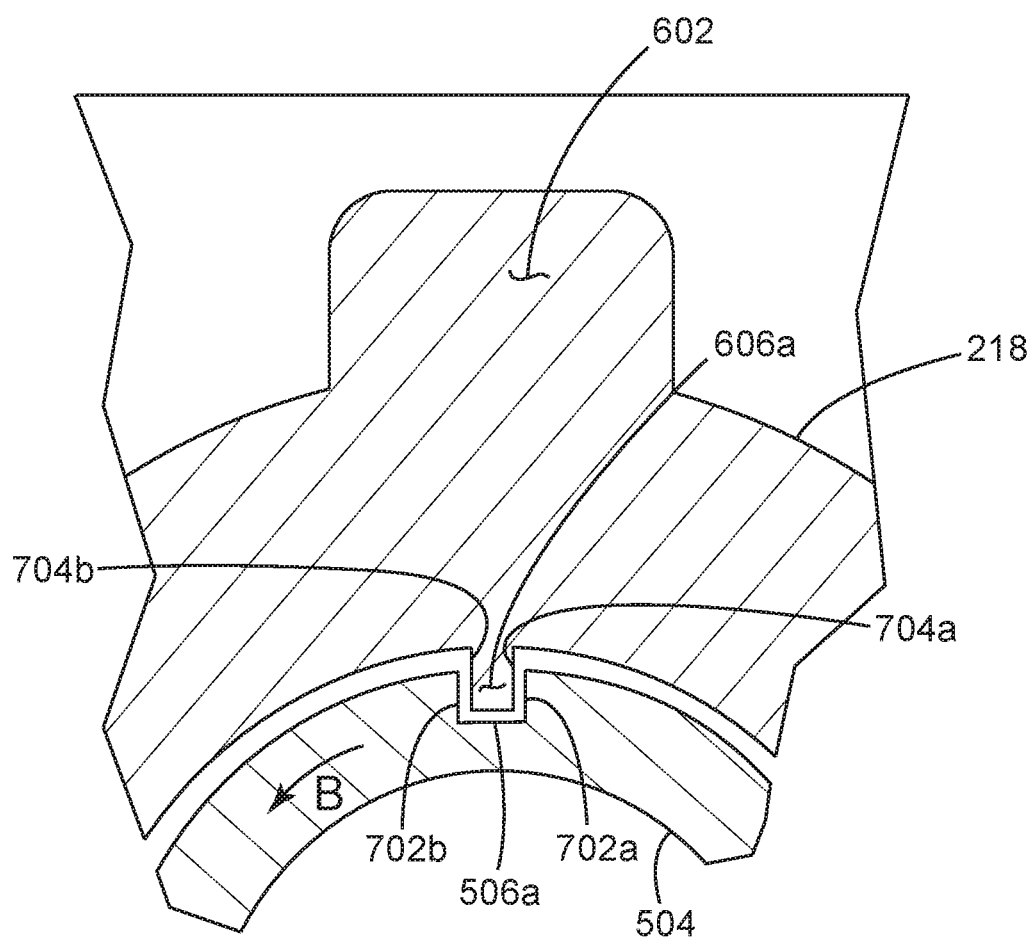

FIG. 7B is a close-up, detailed top view of an assembly between a key-tab portion of the keyed stop washer and a key-channel of the swivel tube portion of the swivel tube assembly, that illustrates a first contact surface of the key-tab coming into contact with a first contact surface of the key-channel when the swivel mount assembly is being rotated in a second direction, according to aspects of the embodiments.

Figure 8:
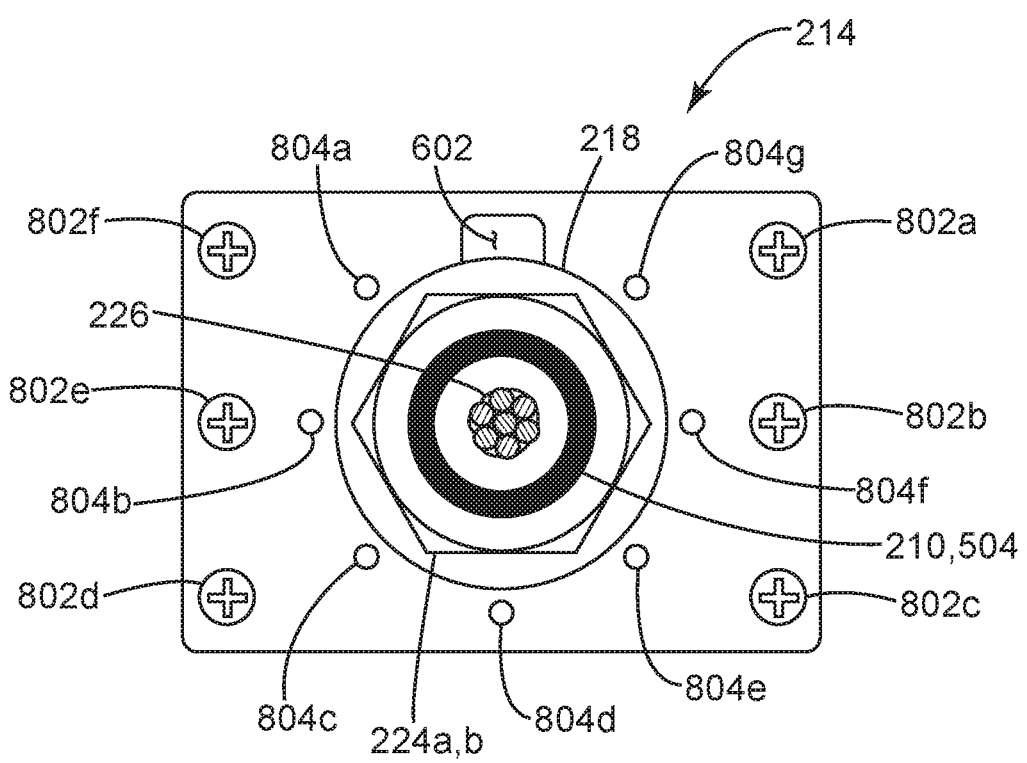

FIG. 8 illustrates a plurality of pre-defined swivel limiting position holes on the swivel stop plate according to aspects of the embodiments.

Figure 9:
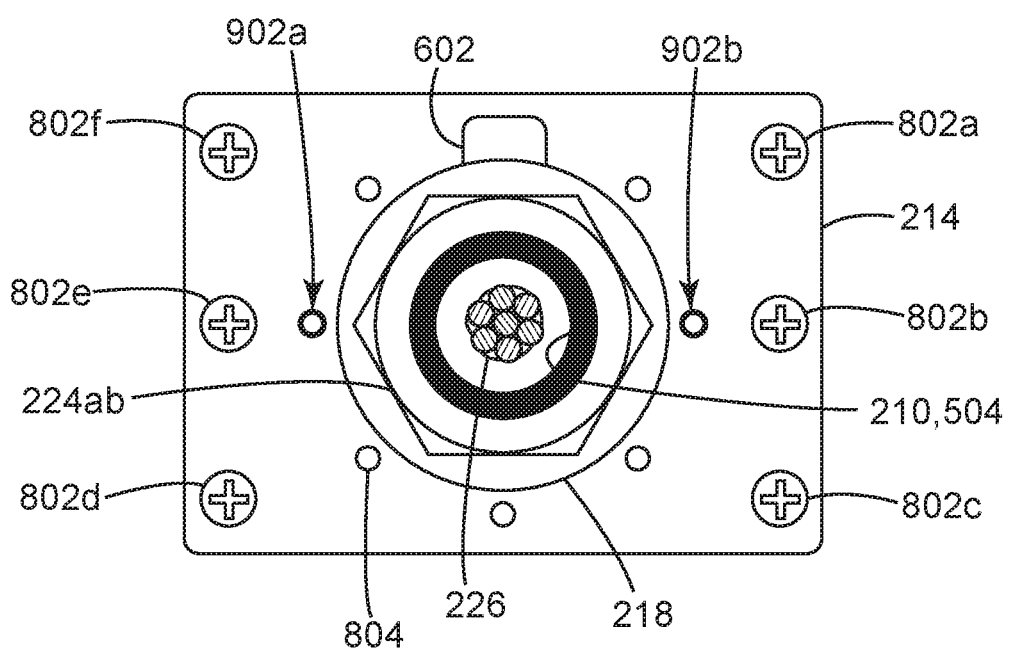

FIG. 9 illustrates adjustment of a range of swivel rotation that can be achieved by placing limiting screws on the stop plate according to aspects of the embodiments.

Figure 10B:
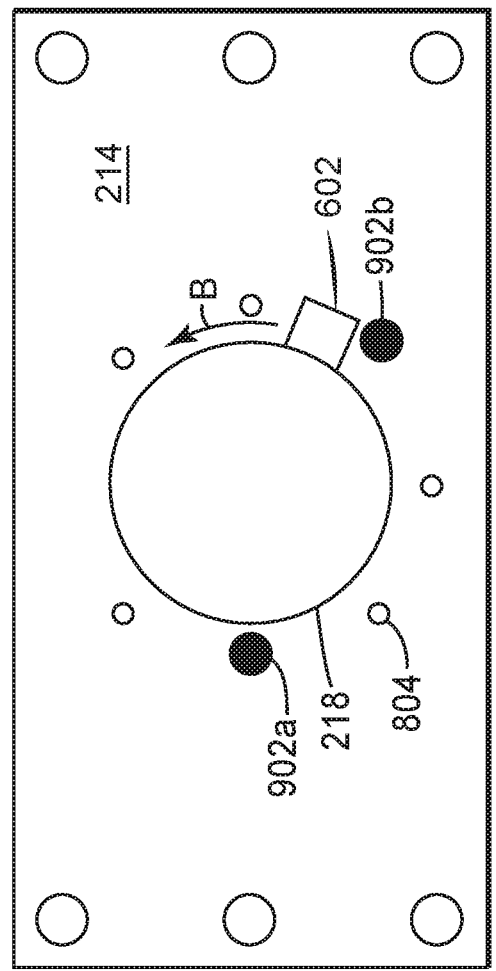
Figure 10A:
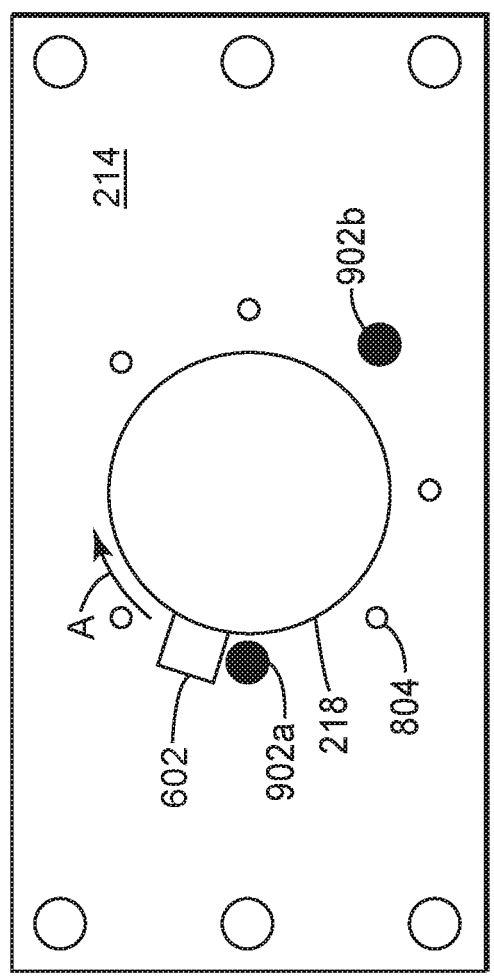

FIG. 10A illustrates a first furthermost range of rotation of a swivel mount assembly and electronic device, and FIG. 10B illustrates a second furthermost range of rotation of the same arrangement of the swivel mount assembly and electronic device as shown in FIGS. 1 and 2, among others, according to aspects of the embodiments.

Figure 11:
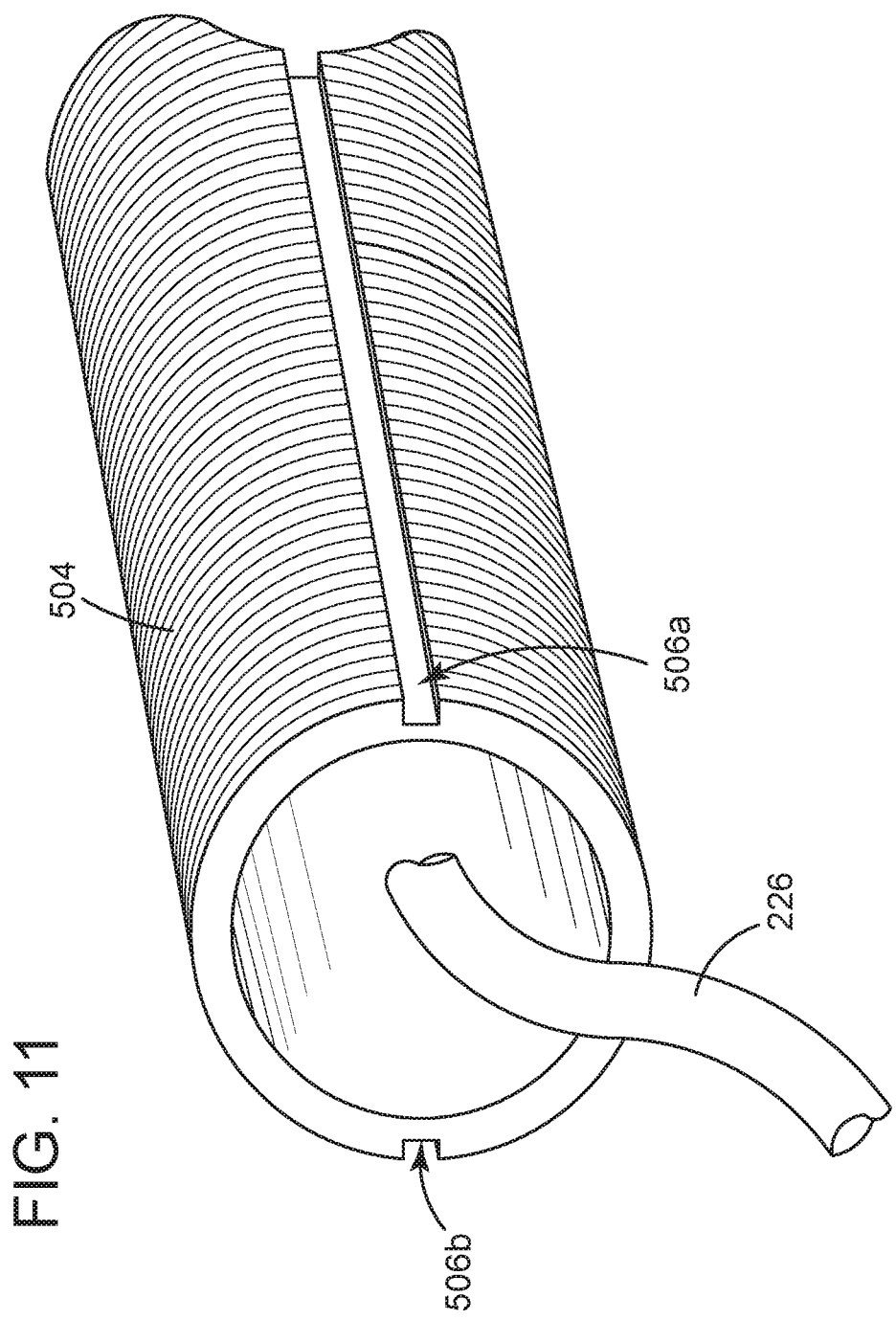

FIG. 11 illustrates a perspective view of the swivel tube assembly tube as shown in FIGS. 2, 4, and 5 according to aspects of the embodiments.

DETAILED DESCRIPTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices described herein.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

List of Reference Numbers for the Elements in the Drawings in Numerical Order The following is a list of the major elements in the drawings in numerical order.
100 Swivel Mount Assembly (SMA)
102 Electronic Device
104 Table
100a First Portion Swivel Mount Assembly
100b Second Portion Swivel Mount Assembly
104a Upper Surface of Table
104b Lower Surface of Table
202 Swivel Platform
204 Rear Cover
206 Feet
208 Felt Pad
210 Swivel Tube Component (STC)
212 Cushioning (Felt) Washer
214 Stop Plate
216 Low Surface Friction Washer
218 Keyed Stop Washer
220 Compressible Flat Washer
222 Flat Washer
224 Jam Nut
226 Cables
230 Rotation Limiting Assembly
240 Securing Assembly
302 Attaching Screw Hole
502 Swivel Tube Assembly Mounting Plate (Mounting Plate)
504 Swivel Tube Assembly Tube (Tube)
506 Swivel Tube Key-Channel (Key-Channel)
508 Attaching Screw Hole
602 Stop Washer Tab
604 Stop Washer Inner Radius Surface
606 Stop Washer Key-Tab (Key-Tab)
608 Stop Washer Body Surface
702 Contact Surface of Key-Channel
704 Contact Surface of Key-Tab
802 Stop Plate Securing Screw
804 Swivel Limiting Position Holes
902 Swivel Rotation Limiting Screws (Rotation Limiting Screws)

List of Acronyms Used in the Specification in
Alphabetical Order

The following is a list of the acronyms used in the specification in alphabetical order.
SMA Swivel Mount Assembly
STC Swivel Tube Component The different aspects of the embodiments described herein pertain to the context of a mechanism for mounting and locking electronic devices, and more specifically to a swivel mount system and method of use that can mount, support, and lock electronic devices to a desk or table top, such that the device can rotate about a vertical (normal to the table) axis so that it may be viewed and interacted with by multiple persons in a secure manner, but is not limited thereto, except as may be set forth expressly in the appended claims.

For 40 years Creston Electronics Inc., has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein, as embodied as swivel mount assembly 100, can be manufactured by Crestron Electronics Inc., located in Rockleigh, N.J., and have been marketed and sold under the name of "Swivel Mount Kit for Crestron Mercury Tabletop Conference System," p/n CCS-UCA-SMK.

FIG. 1 illustrates a side view of swivel mount assembly (SMA) 100 mounted to table 104, and which has electronics devices 102 mounted to SMA 100 according to aspects of the embodiments. FIG. 3 illustrates a bottom view of electronic device 102 shown in FIG. 1, with portions of SMA 100 viewable therein, according to aspects of the embodiments. As those of skill in the art can appreciate, the variety and type of electronic devices 102 that can be mounted to SMA 100 is virtually limitless, as long as the form factor and weight bearing considerations are kept in mind. One such electronic device 102 can be a Crestron manufactured and sold Mercury™ unified communications systems device, which incorporates video, audio, and other data type transmission/receptions capabilities, and which can be used to facilitate set-ups of meetings, among other functional operations.

FIG. 2 illustrates an exploded isometric view of SMA 100 as shown in FIG. 1 according to aspects of the embodiments. In FIG. 2, SMA 100 is shown in component form, and formed as two major parts, first portion SMA 100a, which comprises all of the SMA 100 components that are generally located above or on upper table surface 104a, and second portion SMA 100b, which comprises all of the SMA 100 components that are located below or on lower table surface 104b. Those of skill in the art can appreciate that the designation or implementation of components of SMA 100 on or above upper surface 104a as part of first portion 100a can be different depending on the implementation, and thus the example shown in FIG. 2 is not meant to be limiting, and therefore should not be taken in a limiting manner. Similarly, those of skill in the art can appreciate that the designation or implementation of components of SMA 100 on or above lower surface 104b as part of second portion 100b can be different depending on the implementation, and thus the example shown in FIG. 2 is not meant to be limiting, and therefore should not be taken in a limiting manner.

As discussed above, SMA 100 comprises two main portions, first portion 100a and second portion 100b. Furthermore, second portion of SMA 100 can be further subdivided into rotation limiting assembly 230, and securing assembly 240, according to aspects of the embodiments. First portion 100a of SMA 100 is generally located above upper surface 104a of table 104, while second portion 100b of SMA 100 is generally located below lower surface 104b of table 104, according to aspects of the embodiments. As those of skill in the art can now further appreciate, table 104 is but one non-limiting example of a sold, substantially stationary surface upon which SMA 100 can be mounted. For example, and such list is not to be taken in a limiting manner, SMA 100 can be mounted on shelf, or even a wall.

SMA 100 comprises, above upper surface 104a, swivel platform 202, which is attached to a bottom of electronic device 102 in a manner to be described below, rear cover 204, feet 206, felt pad 208, swivel tube component (STC) 210, and felt washer 212 according to aspects of the embodiments. Note that STC 210 traverses a hole cut through table 104 (a non-limiting assembly process is briefly described below), such that a first part of STC 210 remains above upper surface 104a of table 104, and a second part of STC 210 remains below lower surface 104b of table 104, according to aspects of the embodiments.

Swivel platform 202 is removably attachable to the bottom of electronic device 102 via several screws that can be inserted into screw holes 302a-d in swivel platform 202 according to aspects of the embodiments. That is, screws can be inserted into attaching screw holes 302a-d of swivel platform 202 and into electronic device 102. Screws can also be inserted into attaching screw holes 508a-d of mounting plate 502 and then through reciprocal mounting holes in swivel platform 202; these screws assemble STC 210 and swivel platform 202 together, and can be easily removed as well. According to aspects of the embodiments, screw holes 508a-d can be used to assemble swivel platform 202 to STC 210. Attaching screw holes 508a-d and 302a-d are used to assemble SMA 100, or more particularly, according to aspects of the embodiments, STC 210, to electronic device 102.

Feet 206 (which are optional), can be attached to the bottom of swivel platform 202 via use of screws, which, when secured to the bottom of electronic device 102, provides a means for leveling and preventing inadvertent movement and/or skidding of electronic device 102 according to aspects of the embodiments. Use of feet 206 does not prevent rotational movement of electronic device 102 but merely means that a known, sufficient, rotational force is needed to rotate the combined electronic device 102 and SMA 100 according to aspects of the embodiments. Feet 206 can be attached to swivel platform 202 using a screw with thread locking adhesive. Feet 206 substantially prevent swivel platform 202 from damaging upper table surface 104a if felt pad 208 were to be over compressed according to aspects of the embodiments. Feet 206 are relatively smooth and can be made of a relative soft plastic such that they do not mar upper surface 104a of table 104, according to aspects of the embodiments.

Also shown in FIG. 2 as part of first portion 104a is rear cover 204, felt pad 208, and felt washer 212. As those of skill in the art can appreciate, felt can be used to protected surfaces, such as upper surface 104a of table 104, and its use in pad 208 provides protection of upper surface 104a as well as providing a means for easy rotation on upper surface 104a of table 104. Further, use of felt in felt washer 212 also provides protection and a substantially reduced frictional interface between STC 210 and upper surface 104a so that rotation of electronic device 102 can occur easier. Rear cover 204 is also optional, and specific to the type and design of electronic device 102; it provides a means for an operator to access a connection panel so that cables 226, which travel through the majority of components of SMA 100 to reach electronic device 102, can be connected to terminals (not shown) in the rear portion of electronic device 102. As those of skill in the art can appreciate, felt washers are made from tough, industrial quality fibers that are felted to form a durable cushioning material. When used between spacers, felt washers provide advantages such as load distribution, insulation, and light sealing. They also serve to protect installation surfaces by functioning as a soft, flexible barrier. Felt washers can be stamped in a wide range of sizes and thicknesses. According to aspects of the embodiments, felt washer 212 provides a smooth surface for STC 210 to rotate on upper surface 104a. According to aspects of the embodiments, felt pad 208 also supports the weight of electronic device 102, as well as prevents swivel platform 202 from touching upper surface 104a.

According to aspects of the embodiments, second portion 100b comprises stop plate 214 (shown and discussed in greater detail in regard to FIGS. 4 and 8-10), low surface friction washer 216, keyed stop washer 218, compressible flat washer 220, flat washer 222, and a plurality of jam nuts 224. Note that the collection of stop plate 214, low surface friction washer 216, and keyed stop washer 218 can be referred to as rotation limiting assembly 230, and the collection of compressible flat washer 220, flat washer 222, and jam nut 224 can be referred to as securing assembly 240 according to aspects of the embodiments.

Each of the components of first and second portions 100a,b have a substantially circular hole in their respective centers to allow passage of cables 226 to pass through SMA 100 to electronic device 102, so that power and/or other signals can be carried to and from electronic device 102, according to aspects of the embodiments.

As those of skill in the art can appreciate, because SMA 100 swivels, and cables 226 are fixed to electronic device 102, it is generally the case that the rotation angle of electronic device 102 be limited in some manner. That is, it would be unadvisable for continued proper operation of electronic device 102 and cables 226 if electronic device 102 were to be allowed to rotate through multiple rotations of 360°. At some point, the connections between cables 226 and electronic device 102 and/or cables 226 themselves would break. As those of skill in the art can further appreciate, one means for providing for such rotations capabilities, albeit an expensive and more technically challenging one to implement, would be to provide a terminal to cables 226, and use rotating brush contacts; while the implementation of such an assembly is well known to those of skill in the art, these apparatus' generally require additional space and components to put into place, and thus for these types of applications, are generally not cost effective.

According to aspects of the embodiments, low surface friction washer 216 can be fabricated from cork, among other similar materials; in addition to its frictional properties, cork also provides a compressive fitting, and further provides noise isolation. Similarly, compressible flat washer 220 can be fabricated from rubber, as this material provides a frictional interface, as well as a compressive fitting and noise isolation. As those of skill in the art can appreciate, standard or flat washers have at least two main purposes: To distribute the pressure of the nut evenly over the surface, so that the surface isn't damaged; and to ensure that the nut is pressed against a smooth surface, reducing the chance that it will gradually loosen because it is in contact with an uneven surface. Low surface friction washer 216 provides a low surface friction that allows keyed stop washer 218 to rotate smoothly. According to aspects of the embodiments, low surface friction washer 216 can be made of cork. Cork provides a compressible fitting that allows SMA 100 to operate on an uneven table surface 104a without damaging SMA 100. Compressible flat washer 220, which can be fabricated from rubber, substantially reduces vibration and provides a spring tension to prevent jam nuts 224a,b from gradually loosening. Compressible flat washer 220 can also provide a substantially highly compressible fitting that allows SMA 100 to operate on an uneven table surface 104a,b without damaging SMA 100 according to aspects of the embodiments.

STC 210, in operation with felt washer 212, stop plate 214 (part of second portion 100b), low surface washer 216, and keyed stop washer 218, provides the swivel operation of SMA 100 according to aspects of the embodiments. Attention is directed towards FIGS. 4-7. FIG. 4 illustrates a bottom view of swivel stop plate 214, portions of STC 210, keyed stop washer 218, and cable 226, according to aspects of the embodiments. The view of FIG. 4 (as well as those of FIGS. 5-10), are from a bottom view, as if the viewer is located below lower surface 104b of table 104, looking up. In FIG. 4, keyed stop washer 218 has been located on tube 504, which is shown in detail in FIG. 5.

FIG. 5 illustrates a bottom view of STC 210, which comprises base plate 502, and tube 504, which rotates within base plate 502. Tube 504 comprises at least first and second key-channels 506a,b, as shown in FIG. 11. As shown in FIG. 11, the outer surface of tube 504 is threaded in a reciprocating manner to accept jam nuts 224a,b. The at least two key-channels 506a,b, are aligned substantially in parallel, and on substantially opposite sides of, and along substantially the entire length of tube 504 of STC 210, according to aspects of the embodiments. The purpose of key-channels 506a,b is to receive stop washer key-tabs (key-tabs) 606a,b, respectively, of stop washer 218, as shown in FIG. 6, when stop washer 218 is co-located about (or around) tube 504. When so aligned, stop washer 218 will rotate in the same direction as tube 504, as described below in regard to FIGS. 7A and 7B according to aspects of the embodiments.

FIG. 6 illustrates a plan view of keyed stop washer 218, and which comprises at least first and second key-tabs 606a,b on inner radius surface 604 according to aspects of the embodiments. Keyed stop washer 218 further comprises stop washer tab (tab) 602. As discussed above, tube 504 and washer 218 rotate substantially in unison. One purpose of tab 602 is to prevent rotation of SMA 100 by contacting either or both of first and second swivel rotation limiting screws (limiting screws) 902a,b, as shown and described in reference to FIGS. 9 and 10.

Attention is now directed towards FIGS. 7A and 7B. FIG. 7A is a close-up, detailed top view of an assembly between key-tab 606 of keyed stop washer 218 and key-channel 506 of tube 504 of STC 210, that illustrates second contact surface 704b of key-606 tab coming into contact with second contact surface 702b of key-channel 506 when SMA 100 is being rotated in a first direction (in the direction of arrow A), according to aspects of the embodiments.

FIG. 7B is a close-up, detailed top view of an assembly between key-tab 66 of keyed stop washer 218 and key-channel 506 of tube 504 of STC 210, that illustrates first contact surface 704a of key-tab 606 coming into contact with first contact surface 702a of key-channel 506 when SMA 100 is being rotated in a second direction (in the direction of arrow B), according to aspects of the embodiments.

Both of FIGS. 7A and 7B illustrate a close-up, detailed, top view of an assembly between key-tab 606a of keyed stop washer 218 and key-channel 506 of swivel tube 504 of SMA 100 shown in FIGS. 2, 4, and 5, according to aspects of the embodiments.

As shown in FIG. 7A, if SMA 100 and electronic device 102 are rotated in the direction of arrow A, then tube 504 also rotates in the direction of arrow A, and second contact surface 702b of key-channel 506a contacts second contact surface 704b of key-tab 606a, causing keyed stop washer 218 to also rotate in the direction of arrow A. Similarly, if tube 504 rotates in the direction of arrow B, as shown in FIG. 7B, then first contact surface of key-channel 506a encounters first contact surface 704a of key-tab 606a, causing keyed stop washer 218 to also rotate in the direction of arrow B, according to aspects of the embodiments Following assembly of SMA 100 and electronic device 102, the combination will operate as one unit and will rotate in unison, with the exception of stop plate 214, which remains substantially stationary as it is attached (via screws, or other attaching means) to lower surface 104b of table 104, and thus the combined unit of SMA 100 and electronic device 102 rotate about stop plate 214 according to aspects of the embodiments. Compressible flat washer 220, flat washer 222, and jam nuts 224a,b can be referred to as securing assembly 240, and operate together in such a manner that securing assembly 240, low surface washer 216, and keyed stop washer 218 rotate with the remainder of SMA 100 and do not loosen upon such rotation. That is, compressible flat washer 220 acts like a lock washer, keeping nuts 224a,b in compression, thus substantially preventing nuts 224a,b from "backing out" i.e., coming loose.

Low surface washer 216 provides a frictional engagement between stop plate 214 and electronic device 102 and SMA 100 such that they do not rotate too freely. That is, there should be some friction that opposes rotation so that when rotated into a new position, electronic device 102 will tend to stay in the position unless a specific amount of force is expended to rotate it. In addition, low surface friction washer 216, because it is made of cork, provides a smooth surface for keyed stop washer 218 to rotate upon. The combination of the length of tube 504 and nuts 224a,b provide a means for using SMA 100 with tables 104 of varying thicknesses, according to aspects of the embodiments.

FIG. 8 illustrates a plurality of pre-defined swivel limiting position holes 804a-g on stop plate 214 according to aspects of the embodiments, FIG. 9 illustrates adjustment of a range of swivel rotation that can be achieved by placing rotation limiting screws 902 on stop plate 214 according to aspects of the embodiments, FIG. 10A illustrates a first furthermost range of rotation of SMA 100 and electronic device 102, and FIG. 10B illustrates a second furthermost range of rotation of the same arrangement of SMA 100 and electronic device 102 as shown in FIGS. 1 and 2, among others, according to aspects of the embodiments.

Stop plate 214 is attached to lower surface 104b of table 104 via securing screws 802, as described above. Large rotation limiting screws 902 can be inserted into one or two of holes 804a-g in order to predefine the range of rotation of electronic device 102 as shown in FIGS. 9 and 10. FIG. 9 illustrates a first range of swivel rotation that can be achieved by placing limiting screws 902 on stop plate 214 in screw holes 804b, and 804f, according to aspects of the embodiments. In the case of FIG. 9, electronic device 102 and SMA 100 are limited to a field of rotation of about 180°, as stop washer tab 902 would encounter each of screws 902a,b, in screw holes 804b, and 804f. A more detailed view of the range of rotation of electronic device 102 and SMA 100 is shown in FIGS. 10A and 10B.

FIG. 10A illustrates a first furthermost range of rotation of SMA 100 and electronic device 102, and FIG. 10B illustrates a second furthermost range of rotation of the same arrangement of SMA 100 and electronic device 102 according to aspects of the embodiments. As those of skill in the art can appreciate, the illustrations shown in FIGS. 10A and 10B are but examples only, and are not to be taken in a limiting sense; that is, any combination of two rotation limiting screws 902 can be used, as well as just one, in any of the available limiting position holes 804. FIGS. 10A and 10B are simply included to illustrate visually the concept of a limited range of rotations using the apparatus and devices described herein according to aspects of the embodiments.

In FIG. 10A, stop washer 218 and electronic device 102 have been rotated as far counterclockwise (as viewed into the page) as they can go such that tab 602 is stopped by rotation limiting screw 902a. Any further movement by electronic device 102 would now be in the direction of arrow A, i.e., in the clockwise direction as viewed into the pager. In FIG. 10B, stop washer 218 and electronic device 102 have been rotated as far clockwise (as viewed into the page) as they can go such that tab 602 is stopped by rotation limiting screw 902b. Any further movement by electronic device 102 would now be in the direction of arrow B, i.e., in the counter-clockwise direction as viewed into the figure. As such, the range of rotation of SMA 100 and electronic device 102 in the examples shown in FIGS. 10A and 10B is about 135°.

Discussion shall now be directed to the assembly of SMA 100 in regard to electronic device 102, and table 104, according to aspects of the embodiments. As those of skill in the art can appreciate, this discussion is merely but one example and is not to be taken in a limiting manner. To assemble SMA 100 to table 104, a hole is drilled into table 104 that is about 1/16" diameter larger than the threaded diameter of tube 504, as shown in FIG. 5. Stop plate 214 is then centered on the drilled hole in table 104 and screwed into lower surface 104b of the underside of table 104 using 6 screws. Tube 504 can then be attached to swivel platform 202 with 4 flat head screws. Felt washer 212 can then be secured to tube 504 using adhesive tape. As those of skill in the art can appreciate, discussion of such securing means as "adhesive tape" is to be taken in a non-limiting manner; different means of securing are included within this discussion according to further aspects of the embodiments.

Feet 206 can then be attached to swivel platform 202 using a screw with thread locking adhesive. According to aspects of the embodiments, a low friction material such as acetal can be used for feet 206. Felt pad 208 can then be secured to swivel platform 202 using adhesive tape. Rear cover 204 is then assembled to swivel platform 202 with two screws. Prior to attaching the swivel platform sub-assembly to electronic device 102, cable 226 that includes all of the signals and power are passed through jam nuts 224a,b, all the washers 222, 220, 218, 216, and 212, stop plate 214, the tabletop hole, and tube 504. All the necessary cable connections are then made, and the cables are secured with cable tie wraps or other methods so they do not come loose when electronic device 102 is swiveled. The swivel platform sub-assembly is then attached directly to the bottom of the electronic device using fasteners, adhesives, or any other means.

FIG. 3 illustrates a bottom view of electronic device 102 with swivel platform 202, tube 504, felt washer 212, felt pad 208, acetal feet 206, and rear cover 204 attached. The electronic device 102 with STC 210 as shown in FIG. 3 is then lowered into the hole in table 104. Low surface washer 216, keyed stop washer 218, compressible flat washer 220, flat washer 222, and jam nuts 224 are then installed onto threaded swivel tube 504 (see, FIG. 11, among others) in this order. Once SMA 100 is assembled, electronic device 102 can rotate about the center axis of swivel tube 504 according to aspects of the embodiments. The force required to swivel electronic device 102 can be adjusted by loosening or tightening jam nuts 224a,b.

Swivel mount assembly 100 comes with an integrated swivel platform 202 that will securely mount and swivel electronic device 102. Swivel platform 202 has a low profile from upper surface 104a of table 104 that makes it less noticeable. Swivel platform 202 can be designed to mount electronic devices 102 of various sizes.

As discussed in regard to several of the Figures, reference is made to several dimensions, including several radii, angles, height, among others. Those of skill in the art can appreciate that although examples of dimensions are provided, these should not be taken in a limiting manner; that is, the aspects of the embodiments are not to be construed as defined or limited by the specific example of the dimensions shown and discussed, but instead are provided merely for illustrating an example of what a device that incorporates the aspects of the embodiments could, in a non-limiting manner, look like. Furthermore, as those of skill in the art can appreciate, since the aspects of the embodiments are directed towards a physical object, with dimensional characteristics, all of the parts will have various dimensions, some of which are not shown in fulfillment of the dual purposes of clarity and brevity. According to still further aspects of the embodiments, some of these objects will have dimensional characteristics that lend themselves to aesthetic aspects; in fulfillment of the dual purposes of clarity and brevity, dimensions in this regard have also been omitted. Therefore, as the aspects of the embodiments are directed towards a swivel mount system and method of use that can mount, support, and lock electronic devices to a desk or table top, such that the device can rotate about a vertical (normal to the table) axis so that it may be viewed and interacted with by multiple persons in a secure manner, it is to be understood that the dimensions of the different objects, some dimensions shown, some dimensions not shown, will be understood by those of skill in the art.

The disclosed embodiments provide a system and method for a swivel mount system and method of use that can mount, support, and lock electronic devices to a desk or table top, such that the device can rotate about a vertical (normal to the table) axis so that it may be viewed and interacted with by multiple persons in a secure manner. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

Industrial Applicability

To solve the aforementioned problems, the aspects of the embodiments are directed towards a swivel mount system and method of use that can mount, support, and lock electronic devices to a desk or table top, such that the device can rotate about a vertical (normal to the table) axis so that it may be viewed and interacted with by multiple persons in a secure manner.

Alternate Embodiments

Alternate embodiments may be devised without departing from the spirit or the scope of the different aspects of the embodiments.

What is claimed is:

1. A swivel mount assembly for rotational mounting an electronic device onto a substantially stationary apparatus comprising:
    a swivel platform adapted to mount the swivel mount assembly to an electronic device;
    a swivel tube assembly attached to the swivel platform, and
        adapted to be inserted through a hole in the substantially stationary apparatus, and
        wherein the swivel tube assembly is further adapted to provide rotational movement of the electronic device in regard to the substantially stationary apparatus;
    a rotation limiting assembly adapted to limit a rotation of the swivel mount assembly about the substantially stationary apparatus; and
    a securing assembly adapted to secure the swivel tube assembly to the substantially stationary apparatus in a securing but rotational manner, and wherein
    the swivel tube assembly comprises:
        a swivel tube, comprising one or more channels on an exterior surface of the swivel tube; and
        a mounting plate adapted to rotationally retain the swivel tube, and wherein the mounting plate is further adapted to secure the swivel mount assembly to the electronic device, and further wherein the rotation limiting assembly comprises:
- a stop plate, the stop plate comprising a plurality of swivel limiting position holes, each of the swivel limiting position holes adapted to retain a screw;
- a keyed stop washer, the keyed stop washer comprising:
  - one or more channel tabs, wherein each of the one or more channel tabs is adapted to fit within the one or more channels on the swivel tube; and
  - a stop washer tab, wherein the stop washer tab is adapted to interface with the screw that can be located in one or two swivel limiting position holes of the plurality of limiting position holes to substantially prevent rotation of the electronic device and the swivel tube.

2. The swivel mount assembly according to claim 1, wherein
the plurality of swivel limiting position holes can be located at substantially any position within a circle with a radius such that the screw interfaces with the stop washer tab, such that substantially any angle of rotation can be achieved.

3. The swivel mount assembly according to claim 2, wherein
said any angle of rotation is limited to less than about 360°.

4. The swivel mount assembly according to claim 1, wherein the securing assembly comprises:
- one or more frictional washers;
- two or more jam nuts,
- a rubber washer, and
- a flat washer.

5. The swivel mount assembly according to claim 1, wherein swivel platform comprises:
a substantially planar component adapted to be removably attachable to a plurality of electronic devices.

6. The swivel mount assembly according to claim 5, wherein
the substantially planar component can be fabricated to match a shape and size of any one the plurality of electronic devices.

7. The swivel mount assembly according to claim 1, wherein
the swivel tube is adapted to provide passage for one or more of cables that provide one or more of power and data communications to and from the electronic device.

8. The swivel mount assembly according to claim 1, wherein
the rotation limiting assembly is limited in rotation to less than about 360°.

* * * * *